July 1, 1958     E. S. LACHICOTTE     2,840,946

MINNOW LIKE FISHING LURE

Original Filed Feb. 24, 1954

INVENTOR.
EUGENE S. LACHICOTTE
BY
ATTORNEY

United States Patent Office 2,840,946
Patented July 1, 1958

2,840,946
MINNOW LIKE FISHING LURE

Eugene S. Lachicotte, Charleston, S. C.

Continuation of application Serial No. 412,202, February 24, 1954. This application November 15, 1956, Serial No. 622,424

1 Claim. (Cl. 43—42.48)

This invention relates to fishing lures and more particularly to a trolling or casting sinking lure which simulates the swimming action of a minnow through a simultaneous yawing and rolling action of the lure.

This application is a continuation of my copending application entitled Fishing Lure, filed February 24, 1954 and bearing Serial Number 412,202.

As is well known to skilled fishermen, one of the problems connected with most lures is that there is a tendency for the lure to rise and come out of the water when trolling at high rates of speed, especially those not equipped with a "spoon" to combat such tendency. While lures have been devised which simulate the natural swimming actions of a fish, most of these are complicated devices having a hinge in their medial portion commonly known as "brokenback" lures. Most of these lures are not suitable for both casting and trolling because either the lure will tend to sink too deeply if it is a trolling lure or rise to the surface if it is a casting lure when employed other than for the purpose for which they were specifically designed.

Accordingly, it is an object of this invention to provide a lure of simple, inexpensive construction which will simulate the swimming action of a minnow to a greater extent than has heretofore been possible.

Another object of my invention is to provide a versatile lure or plug which may be employed either as a trolling or casting lure.

Still another object of my invention is to provide a lure of simple one-piece construction which may be manufactured cheaply and which will offer a superior minnow action when used for trolling or casting.

I accomplish these and other objects of my invention by providing a lure or plug consisting of a fish-like body, with a weight carried in the front portion of the body for moving the center of gravity of the body into the forward portion thereof and having means for attaching a line to the lure at the top portion thereof adjacent the center of gravity. With a lure of this general configuration and having the line so attached, movements will be set up causing the lure to oscillate simultaneously about both a vertical axis passing through the center of gravity of the lure and about a longitudinal horizontal axis passing through the center of gravity of the lure to imitate swimming movements.

I further accomplish the objects of my invention by providing means for attaching hooks to the lower portion of the body between the center of gravity and the front of the body and at the rear of the body so that the weight and drag of these hooks offset each other to maintain the balance of the lure.

While some of the objects have been set forth above, others will appear to those skilled in the art relating to fishing equipment, when the specification is read in connection with the drawings in which.

Figure 1:
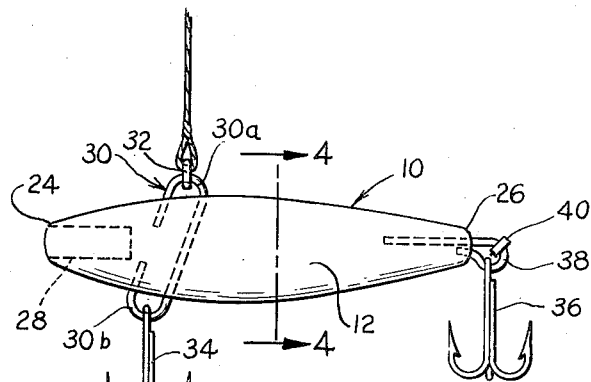
Figure 1 is a side elevation showing the lure attached to a line.
Figure 2:
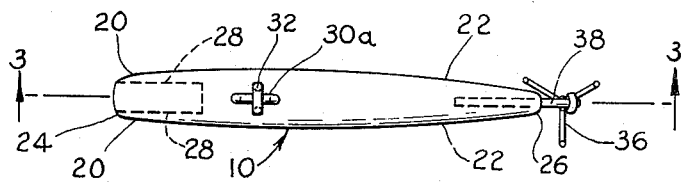
Figure 2 is a top plan of the lure shown in Figure 1.
Figure 3:
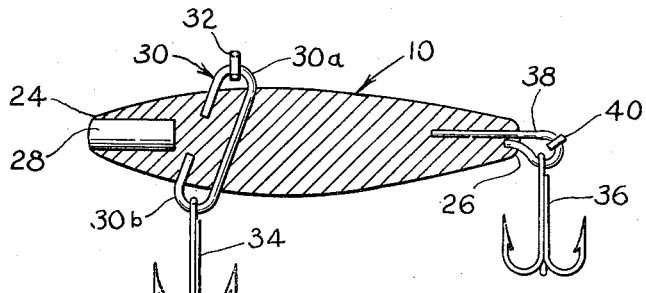
Figure 3 is a sectional view taken along the line 3—3 in Figure 2.
Figure 4:
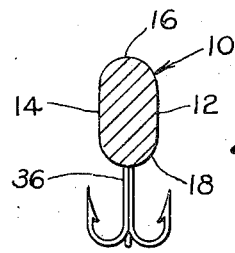
Figure 4 is a sectional view taken along the line 4—4 in Figure 1.

Referring more specifically to the drawings the numeral 10 broadly designates the lure body which is constructed, preferably, from wood but which may be constructed of any suitable material such as plastic or metal. It will be noted that the body has relatively high substantially vertical sides 12 and 14 of slightly convex configuration and that these sides taper inwardly at the top and bottom into arcuate top and bottom portions 16 and 18. It will also be noted that these sides 12 and 14 taper inwardly toward the front and rear as at 20 and 22 respectively. The taper of the body toward the rear is somewhat greater than the taper toward the front and the taper toward the top is somewhat greater than the taper toward the bottom. A fish-shaped body portion is thus formed having a front portion 24 which is larger than the rear 26. It will be noted further that the taper of the bottom 18 downwardly toward the middle is greater than the taper of the top 16 upwardly toward the middle.

A weight 28, which may be of lead or any suitable heavy material is embedded in the medial portion of the front of the lure. This weight moves the center of gravity into the forward portion of the lure to an extent depending upon the size of the weight.

An elongated looped element 30 is positioned adjacent the center of gravity of the body and passes through the body intersecting the horizontal axis of the body at an angle of about 70 degrees. The looped element is disposed in the longitudinal vertical plane of the longitudinal axis of the body to offer a minimum of resistance when it is pulled through the water. The looped element 30 projects from the top and bottom of the body 10 to form loops 30a and 30b. A ring 32 is fashioned to pivot on the loop 30a and provides a means for attaching a line thereto in a manner that will allow the lure to hang freely therefrom.

Treble hooks 34 are pivotally secured to the lower loop 30b and another set of treble hooks 36 is secured to a loop 38 which projects rearwardly from the rear of the lure. It will be noted that the hooks 30 and 36 tend to counterbalance each other so as not to upset the balance of the lure. An abutment 40 is carried by the loop 38 to prevent the hooks from rising beyond a certain point on the loop when moving through the water. This prevents the hooks from becoming entangled and maintains them in an effective position.

In operation the lure movements are such that they closely resemble the swimming action of a minnow. These movements are brought about by the delicate balance of the lure achieved by the above described arrangement of parts. When casting or trolling, the pulling motion is never uniform due to the "wiggling" of the rod. Once oscillatory movements are set up they will continue by virtue of a balance and the forces brought to bear as the lure is pulled through the water. With the line attached above and adjacent the center of gravity the lure will oscillate about a substantially vertical axis passing through the point of attachment since the greater surface area is in the rear while the weight is balanced at or near that point. The lure will also oscillate about a horizontal axis due to the attaching of the line above the center of gravity and its resulting lateral instability due to the fact that a greater surface area is below the center of gravity.

The oscillations referred to above take place because of movements of the line to which the lure is attached. After such oscillations are set up, they will continue because after movement occurs about one axis a greater surface area is presented in the direction of travel so that the force of water against this surface results in movement in the opposite direction about that axis. Because such oscillations occur simultaneously, a minnow action is simulated through the simultaneous rolling and yawing action of the lure described above.

This lure may be painted in a variety of colors and any desired decorations may be added to particularly adapt the lure for a desired type of fishing. While possessing a simplicity of design the lure is also possessed of considerable versatility in that it may be used in casting or as a sinking or trolling lure. The drag of the forward weights in the water tends to hold the front portion of the lure down. If desired the point of attaching the line may be disposed slightly to the rear of the center of gravity thus adding to this tendency and further causing the front portion to decline forwardly thus making fast trolling possible and combating the tendency of the lure to rise from the water.

While a preferred embodiment of my invention has been described using specific terms, such description is for illustrative purposes only, and it is to be understood that changes and variations may be made without departing from the spirit or scope of the invention as defined by the appended claim.

I claim as my invention:

A fishing lure comprising an elongated body tapering inwardly toward the front and rear, said body having relatively high substantially vertical sides of slightly convex configuration tapering inwardly at the top and bottom into arcuate top and bottom portions, the taper of the body toward the rear being somewhat greater than the taper toward the front and the taper toward the top being somewhat greater than the taper toward the bottom, the bottom of said body tapering downwardly from the front and rear thereof toward the medial portion thereof so that a greater surface area is located below rather than above the center of gravity, an elongated looped element passing through said body and having its longitudinal axis intersecting the longitudinal axis of said body in the front portion thereof; at a point about one-third of the distance from the front of the body to the rear of the body; at an angle of about 70 degrees, said looped element being disposed in the longitudinal vertical plane of the longitudinal axis projecting from the top and bottom portions a sufficient distance to pivotally attach hooks to the bottom of the loop and a ring to the top of the loop, means for pivotally positioning hooks on the rear portion of the body so that such addition of hooks compensates to maintain the center of gravity of the lure, said body having an axial bore disposed in the front portion of the lure and a weight disposed in the bore being of sufficient size to balance the lure when it is suspended from a line attached to the ring so that the lure will incline slightly downwardly toward the front so that the greater surface area of the lure is located to the rear of the center of gravity of the lure, whereby when the lure is pulled through the water, oscillatory movements are set up about the vertical axis passing through the looped element where the line is attached, since the greater surface area of the lure is located to the rear of the center of gravity of the lure, simultaneously with oscillatory movement about a longitudinal horizontal axis since the greater surface area is located below the center of gravity of the lure, thus simulating the swimming movements of a minnow.

References Cited in the file of this patent

UNITED STATES PATENTS

| | | |
|---|---|---|
| D. 142,305 | Poplin | Aug. 28, 1945 |
| 810,017 | Ackerman | Jan. 16, 1906 |
| 1,636,832 | Pagin | July 26, 1927 |
| 1,813,843 | Flood | July 7, 1931 |
| 1,950,075 | Akerson | Mar. 6, 1934 |
| 1,960,488 | Gray | May 29, 1934 |
| 2,017,903 | Johnson | Oct. 22, 1935 |
| 2,229,369 | Buettner | Jan. 21, 1941 |
| 2,315,304 | Upperman | Mar. 30, 1943 |